United States Patent
Srinivasa

(10) Patent No.: US 7,085,434 B2
(45) Date of Patent: Aug. 1, 2006

(54) SPRITE RECOGNITION IN ANIMATED SEQUENCES

(75) Inventor: Deepak M Srinivasa, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 715 days.

(21) Appl. No.: 10/261,917

(22) Filed: Oct. 1, 2002

(65) Prior Publication Data

US 2004/0062440 A1 Apr. 1, 2004

(51) Int. Cl.
*G06K 9/32* (2006.01)

(52) U.S. Cl. ..................................... 382/293

(58) Field of Classification Search ................ 382/293, 382/294, 295, 173
See application file for complete search history.

(56) References Cited

U.S. PATENT DOCUMENTS

| | | |
|---|---|---|
| 4,853,775 A | 8/1989 | Rouvrais et al. |
| 5,706,417 A * | 1/1998 | Adelson ..................... 345/640 |
| 5,943,445 A | 8/1999 | Dufaux |
| 6,064,393 A * | 5/2000 | Lengyel et al. ............. 345/427 |
| 6,205,260 B1 | 3/2001 | Crinon et al. |

OTHER PUBLICATIONS

Jessica K. Hodgins, James F. O'Brien, and Robert E. Bodenheimer, Jr. *Computer Animation*. College of Computing and Graphics, Visualization and Usability Center. Georgia Institute of Technology.

James D Foley et al. *Computer Graphics, Principles and Practice*, Second Edition. Addison-Wesley, Reading, MA, 1990, pp. 1057-1065.

* cited by examiner

*Primary Examiner*—Joseph Mancuso
*Assistant Examiner*—Robert Tarcu
(74) *Attorney, Agent, or Firm*—Anthony V. S. England; T. Rao Coca

(57) ABSTRACT

Sprite identification in animated sequences is achieved by performing three separate but related procedures, namely (i) identification of the sprite, (ii) identification of the background and (iii) identification of the identified sprite's translation path. By analyzing a sequence of frames, sprite definition is first established. Then, using the definition of the sprite, a determination is made of the background image and translation path taken. This analysis allows the animated sequence to be compressed in a format in which the background and the sprites are separately identified.

24 Claims, 27 Drawing Sheets

X(1,2)

SPRITE RECOGNITION IN ANIMATED SEQUENCES

FIELD OF THE INVENTION

The present invention relates to recognizing sprites in animated sequences.

BACKGROUND

Animation involves the production of consecutive images, which when displayed, convey a perception of motion. The most common form of two-dimensional animation is sprite animation. A sprite is a bitmap image or a set of images that are composited over a background, producing the illusion of motion. Sprite animation is relatively fast and easy with modern computers. Also, sprites are typically selected from a library of suitable image. Consequently, if in an animation sequence the sprite can be identified, the sprite can be searched for within the library and the results used in further inferring the animation sequence, its context and other details.

Sprites for encoding video data is the focus of U.S. Pat. No. 5,943,445 issued Aug. 24, 1999 and assigned to Digital Equipment Corporation and entitled "Dynamic Sprites for Encoding Video Data". U.S. Pat. No. 5,943,445 describes segmenting frames into rigid and non-rigid bodies, and identifying these bodies as sprites. Some suitable techniques for such encoding are presented in U.S. Pat. No. 4,853,775 issued Aug. 1, 1989 and assigned to Thomson-CSF and entitled "Method and Device to Estimate Motion in a Sequence of Moving Pictures". Both these United States patents relate to estimating local motion vectors by performing gradient operations.

Sprite-based encoding is described in the U.S. Pat. No. 6,205,260 issued Mar. 20, 2001 and assigned to Sharp Laboratories of America, Inc and entitled "Sprite-based Video Coding System with Automatic Segmentation Integrated into Coding and Sprite-building Process". This reference describes analysing MPEG video and disassociating the foreground from the background, with no restrictions on the moving objects etc. Complex mathematical transformations, such as affine transformations, perspective transformations, warping operations etc, are extensively used to separate a sprite from its background.

The above-described two references describe techniques that are relatively complicated, and involve complex mathematical operations.

In view of the above observations, a need clearly exists for techniques that are able to identify sprites against a background.

SUMMARY

Certain 2D animation sequences, especially cartoon animations, have a constant background image, while sprites (for example, actors or objects of the animation) are moving in the foreground to create the animation effect. Once created, the animation is streamed as a sequence of images with the background and the sprites seamlessly integrated.

Described herein are techniques for identifying sprites when a sequence of animation images is provided. Techniques of this sort can be usefully provided for compressing animation sequences for storage and transmission. Animation sequences can be stored in a format in which the background and the sprites are separately identified.

Other applications exist in the fields of surveillance, image understanding, sprite-based video search and sprite-based video conferencing. The relative simplicity of the geometric operations used in the described technique allows further refinements to be added by those skilled in the art.

The described techniques use relatively simple geometric operations and binary bit manipulation operations to identify sprites in animation sequences.

The described techniques involve three separate but related procedures, namely (i) identification of the sprite, (ii) identification of the background and (iii) identification of the identified sprite's translation path. By analysing a sequence of given images (also referred to as frames), sprite definition is first established. Then, using the definition of the sprite, a determination is made of the background image and translation path taken.

DETAILED DESCRIPTION

Figure 1:
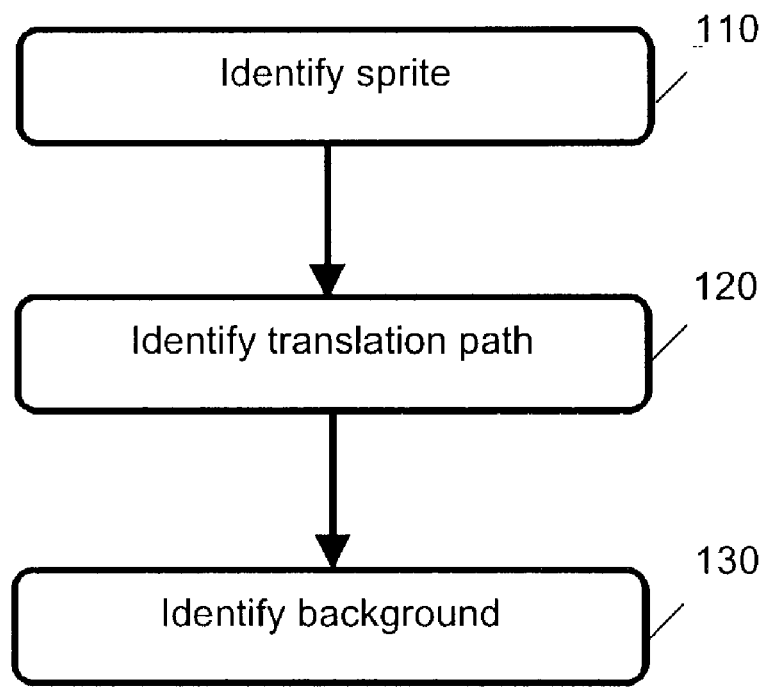
FIG. 1 is a flowchart of separate processing stages involved in the techniques described herein.

There are three distinct stages involved in the described techniques, namely: (i) sprite identification, (ii) translation path identification and (iii) background identification. Each of these stages is described in turn following description of particular operations involved in these stages. FIG. 1 flowcharts these three respective steps 110, 120 and 130.

Techniques described herein algorithmically identify the sprite and get the sprite definition (that is, the sprite pixels) from this animation sequence. If this identification is possible, then the animation sequence of frames can be compressed into one background image, one sprite image and the translation route that the sprite takes. This can save a lot of storage space and transmission time. Compression of this sort can also assist in analysing image sequences.

Assumptions

Consider a sequence of images (that is, an animation sequence) that satisfies the following criteria listed below.

1. There is a single sprite in the animation. That is, only one object is moving in the animation sequence.

2. The background does not change throughout the animation. That is, all the images provided in the animation sequence will have the same background image.

3. The sprite only translates during the animation. The sprite does not change shape, size or orientation during the animation. That is, there is no rotation or scaling.

4. The sprite's boundary pixels are of a different colour than the background. The internal pixels of the sprite can have the same colours as that of the background.

5. At least three frames are given in the animation sequence.

Sample Animation

Figure 2:
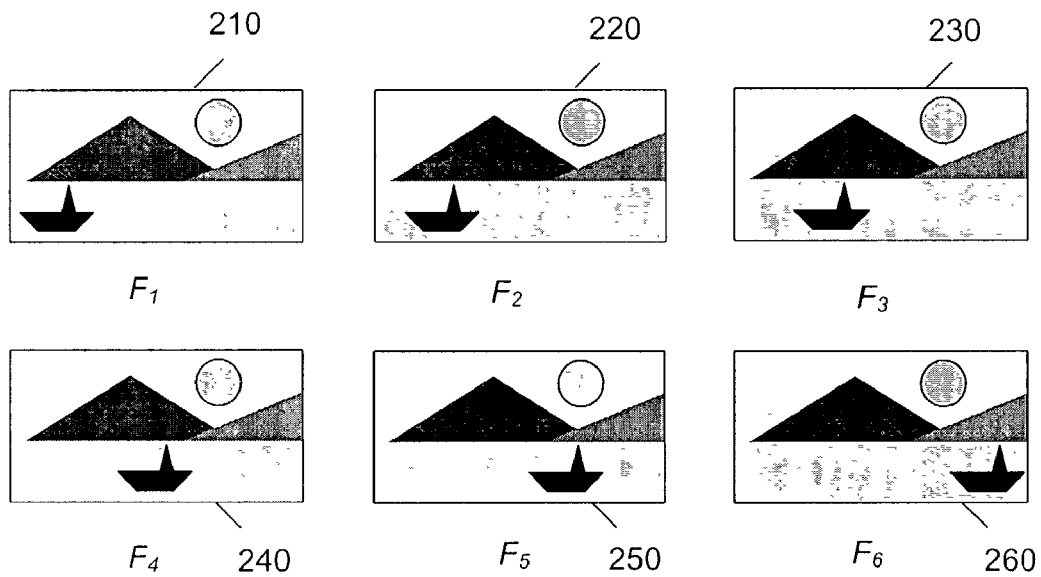
FIG. 2 comprises six individual images (labelled $F_1$ to $F_6$) that constitute frames of an example animation sequence, from which the frames of FIGS. 3 to 21 are each derived.

FIG. 2 represents a sample animation sequence having 6 frames, each labelled $F_1$ to $F_6$ using respective reference numerals 210 to 260. Observe that the sprite is the boat and that the boat is only translating across the "frame", from left to right. The background image does not change. The boundary pixels of the sprite are of a different color than the background, represented here in greyscale. Hence this animation sequence satisfies all the constraints listed above.

Flip Operation

There are two different kinds of flip operation used in the described techniques, namely Horizontal Flip (h-Flip) and the Vertical Flip (v-Flip) operations. These flipping operations are done on an image (or frame) with respect to a rectangle inside that frame. The h-Flip operation results in the exchange of pixel-columns inside the rectangle of the target image. The v-Flip operation results in the exchange of pixel-rows inside the rectangle of the target image.

Figure 3:
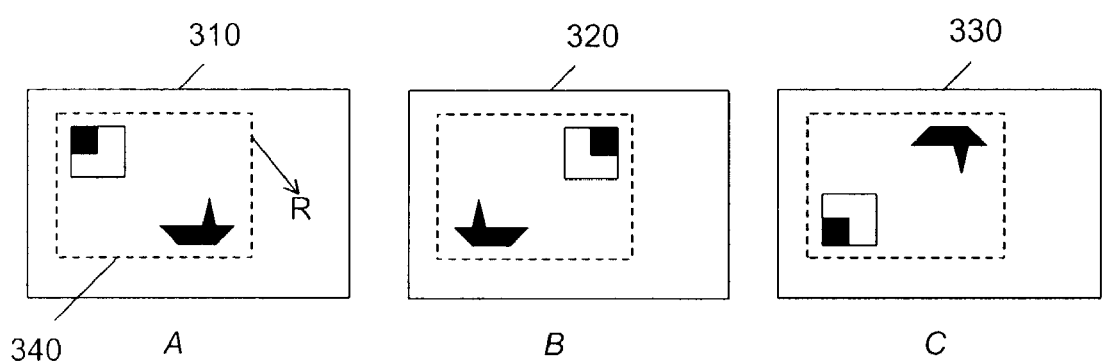
FIG. 3 comprises three frames (labelled A, B and C) that in combination illustrate horizontal and vertical "flip" operations performed on a source frame.

FIG. 3 schematically represents frames A 310, B 320 and C 330 that depict these flip operations. Consider frame A 310 represented in FIG. 3. This is the source frame and a rectangle designated R 340 is shown inside frame A 310. The frames B 320 and C 330 are a result of respectively performing h-Flip and v-Flip operations on A 310 with respect to rectangle R 340.

These two flip operations are represented as B=h-Flip(A, R) and C=v-Flip(A, R).

XOR Operation

An XOR operation is a binary operation whose behaviour is indicated in the truth table of Table 1. This operation is represented herein as X=A/B. Note that A and B are two input frames and the resulting frame is referred to as X.

TABLE 1

| Pixel(p, q) in A | Pixel(p, q) in B | Output Pixel(p, q) in X |
|---|---|---|
| w | w | White |
| w | v | Black |

Figure 4:
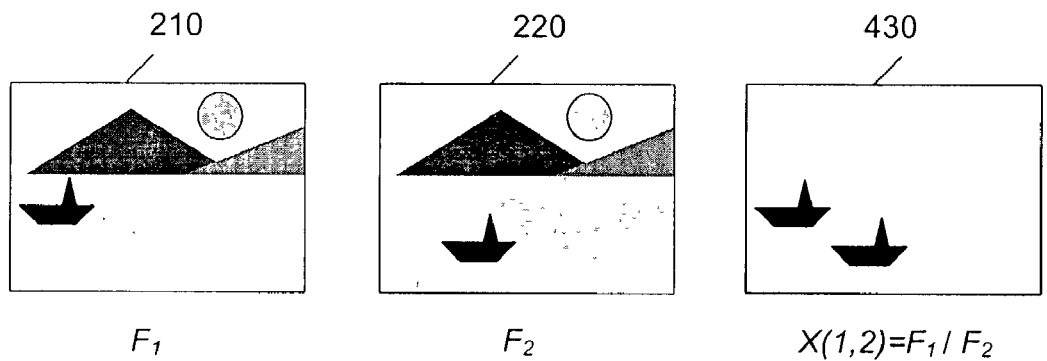
FIG. 4 comprises three frames (labelled $F_1$, $F_2$ and X) that in combination illustrate an "XOR" operation performed on two source frames.

FIG. 4 schematically represents frames that illustrate the described XOR operation.

Consider frames $F_1$ 210 and $F_2$ 220. If corresponding pixels in frames $F_1$ 210 and $F_2$ 220 are of the same colour, then the output frame, which is X(1,2) 430, has a white pixel at the corresponding pixel location. Otherwise, the output frame X(1,2) 430 has a black pixel at that location. Observe that only differences between the two input frames are retained in the output frame.

XNOR Operation

An XNOR operation is a binary operation whose behaviour is indicated by the truth table at Table 2. This operation is represented herein as X=A⊕B. Note that A and B are two input frames and the resulting frame is referred to as X.

TABLE 2

| Pixel(p, q) in A | Pixel(p, q) in B | Output Pixel(p, q) in X |
|---|---|---|
| w | w | W |
| w | v | White |

Figure 5:
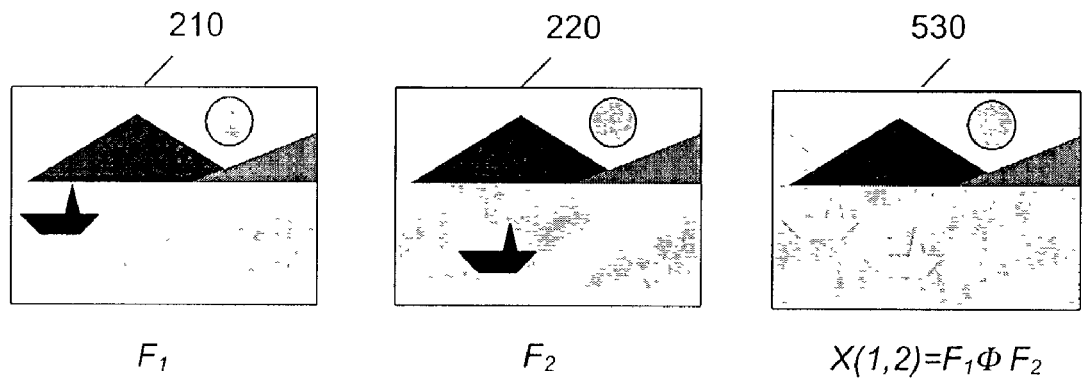
FIG. 5 comprises three frames (labelled $F_1$, $F_2$ and X) that in combination illustrate an "XNOR" operation performed on two source frames.

Consider two frames $F_1$ 210 and $F_2$ 220 represented in FIG. 5. If the corresponding pixels in frames $F_1$ 210 and $F_2$ 220 are of the same colour, then the output frame, which is X(1,2) 530 has a pixel of the same colour in the corresponding pixel location. Otherwise, the output frame X(1,2) 530 has a white pixel in that location. Observe that only differences between the two input frames are removed in the output frame, and similar pixels are retained.

Bounds Operation

Figure 6:
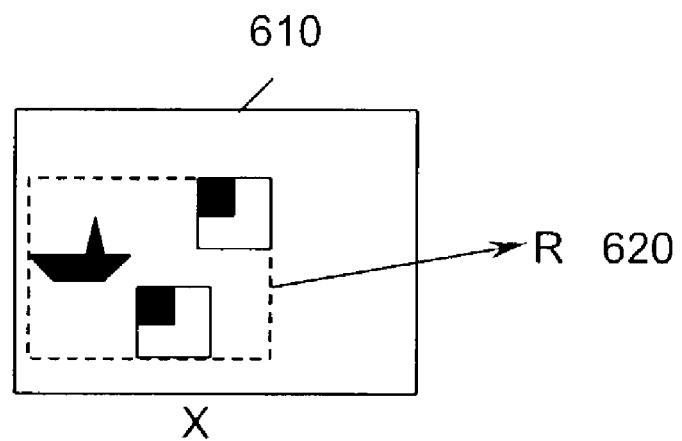
FIG. 6 is a representation that illustrates a "bounds" operation performed on a source frame.

FIG. 6 schematically represents a frame X 610 in which dashed rectangle R 620 is the bounding rectangle of the objects depicted in frame X 610.

Bounding rectangle R 620 for a frame X 610 is obtained using the following sequence of steps.

1. Scan from the top of X 610, each row of pixels, until a row with at least one non-white pixel is obtained. Name that row as 'top'.
2. Scan from the bottom of X 610, each row of pixels, until a row with at least one non-white pixel is obtained. Name that row as bottom.
3. Scan from the left of X 610, each column of pixels, until a column with at least one non-white pixel is obtained. Name that column as left.
4. Scan from the right of X 610, each column of pixels, until a column with at least one non-white pixel is obtained. Name that column as right.

The rectangle defined by the points (left, top) and (right, bottom) is called as the bounding rectangle R 620. Several enhancements can be made to the above-listed steps to reduce iterations, that's not the focus of this work. This bounding operation is represented herein as R=Bounds(X).

Mask Operation

Figure 7:
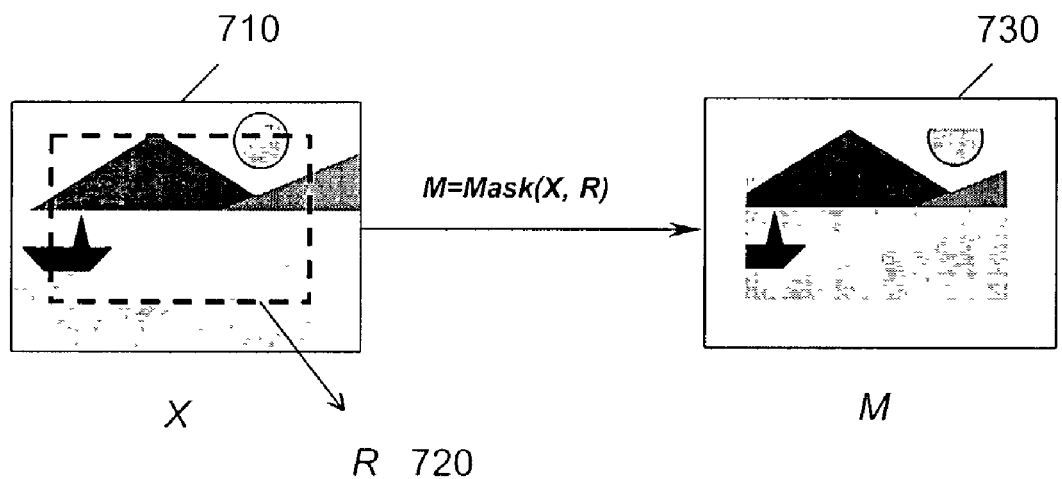
FIG. 7 comprises two images (labelled X and M) that in combination illustrate a "mask" operation performed on a source frame.

FIG. 7 schematically represents frames X 710, in which a bounding rectangle R 720 is specified. Frame M 730 is the result of the mask operation, in which M=Mask(X, R).

In a mask operation, an operand frame X 710 is assumed and a mask rectangle is referred to as rectangle R 720. The output of the operation is a new frame that retains the colors of the pixels inside the mask rectangle, but the pixels outside the mask rectangle are rendered as white. A psuedocode representation of this mask operation is presented in Table 3.

TABLE 3 colour of pixel (p, q) in output frame = colour of pixel (p, q) in input frame if (p, q) is inside R
else
colour of pixel (p, q) in output frame = white

Inverse Mask Operation

Figure 8:
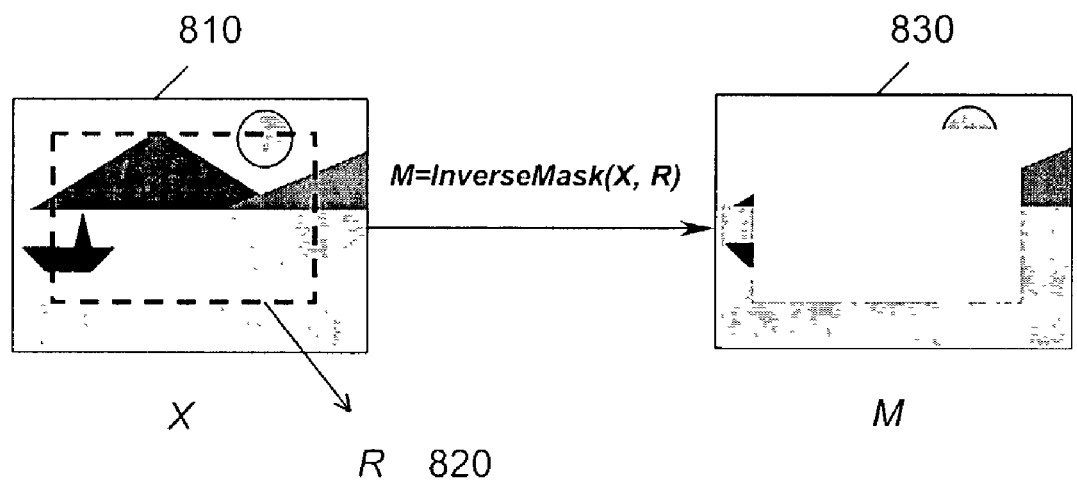
FIG. 8 comprises two images (labelled X and M) that in combination illustrate an "inverse mask" operation performed on a source frame.

FIG. 8 schematically represents frames X 810 and bounding rectangle R 820 involved in an inverse mask operation. Frame M is the result of the inverse mask operation, in which M=InverseMask(X, R).

In this operation, an operand a frame X 810 is assumed and a mask rectangle is referred to as rectangle R 820. The output of the operation is a new frame that retains the colors of the pixels outside the mask rectangle, but the pixels inside the mask rectangle are rendered as white. A psuedocode representation of this inverse mask operation is presented in Table 4.

TABLE 4 colour of pixel (p, q) in output frame = white if (p, q) is inside R
else
colour of pixel (p, q) in output frame = colour of pixel (p, q) in input frame

Addition Operation

Figure 9:
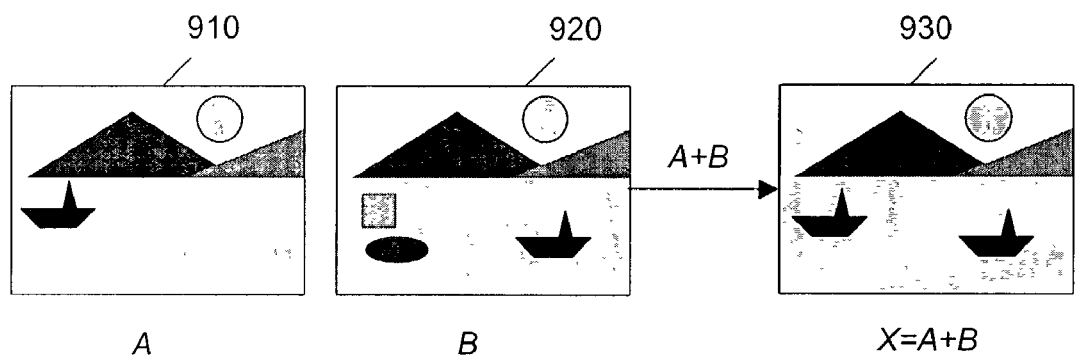
FIG. 9 comprises three frames (labelled A, B and X) that in combination illustrate an "addition" operation performed on two source frames.

FIG. 9 schematically represents operand frames A 910 and B 920, and output frame X 930 of an addition operation.

Given two frames A 910 and B 920, an addition operation produces an output frame that white pixels in frame A 910 replaced by the colors of the corresponding pixels in frame B 920. This addition operation is represented as X=A+B. A pseudocode representation of this addition operation is presented in Table 5.

TABLE 5 colour of pixel(p, q) in X = colour of pixel(p, q) in A if (p, q) is non-white
else colour of pixel(p, q) in X = colour of pixel(p, q) in B.

Sprite Identification

To understand the process of sprite identification, a sequence of operations referred to as FlipUnit is first defined. FlipUnit is a sequence of operations performed on three different frames to extract maximum information about the sprite from these three given frames. Once FlipUnit operations are understood, FlipUnit can be treated as a single operation, and is used to identify the sprite from the sequence of frames supplied.

FlipUnit Operation

A sequence of operations, referred to herein as a FlipUnit operation, is performed on three frames. An animation sequence consists of n frames. This FlipUnit operation applies to any three different frames taken from the sequence of n frames.

Figure 10:
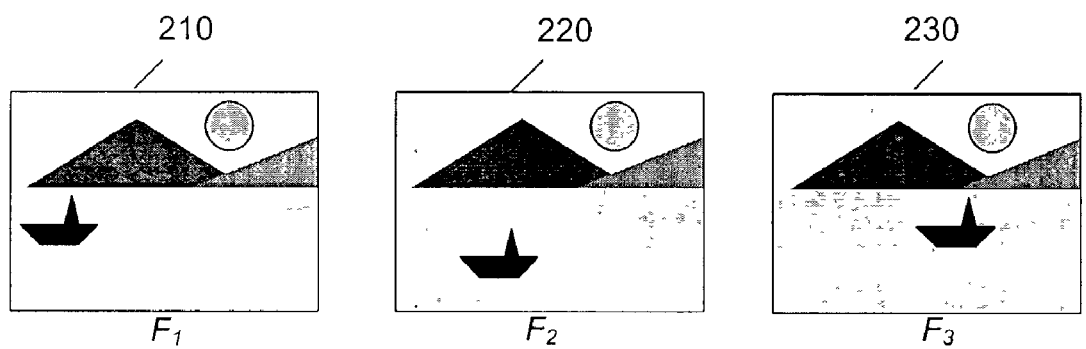
FIG. 10 comprises three images (labelled $F_1$, $F_2$, $F_3$) from the sequence of FIG. 1, which are used in FIGS. 10 to 10 to illustrate a "FlipUnit" operation.

FIG. 10 schematically represents three different frames $F_1$ 210, $F_2$ 220, and $F_3$ 230. The sprite is in different positions in the three respective frames. Once the FlipUnit is understood, the technique used to extract the complete sprite definition from the given n frames can be described in further detail.

Figure 23:
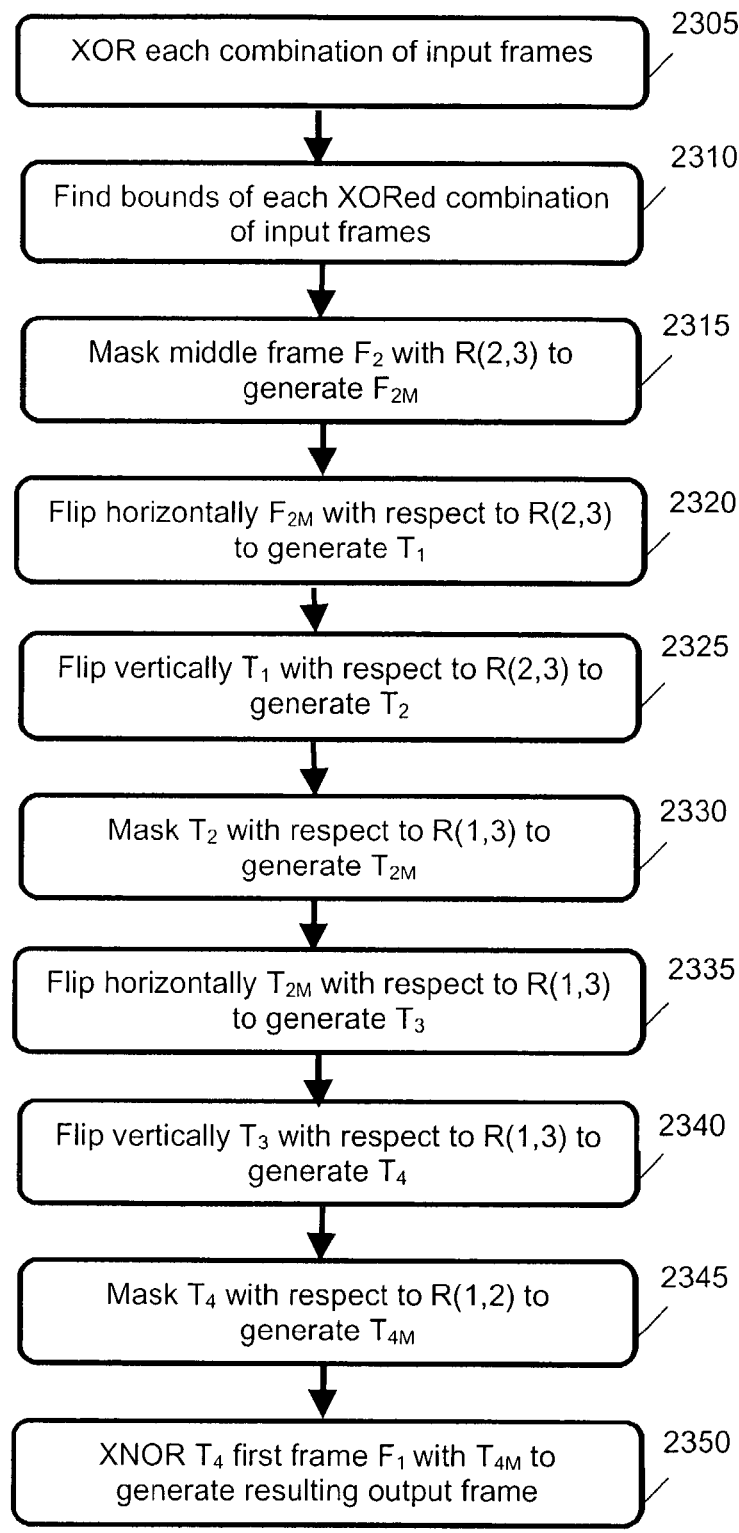
FIG. 23 is a flowchart of a "FlipUnit" operation described with reference to FIGS. 10 to 21.
Figure 24:
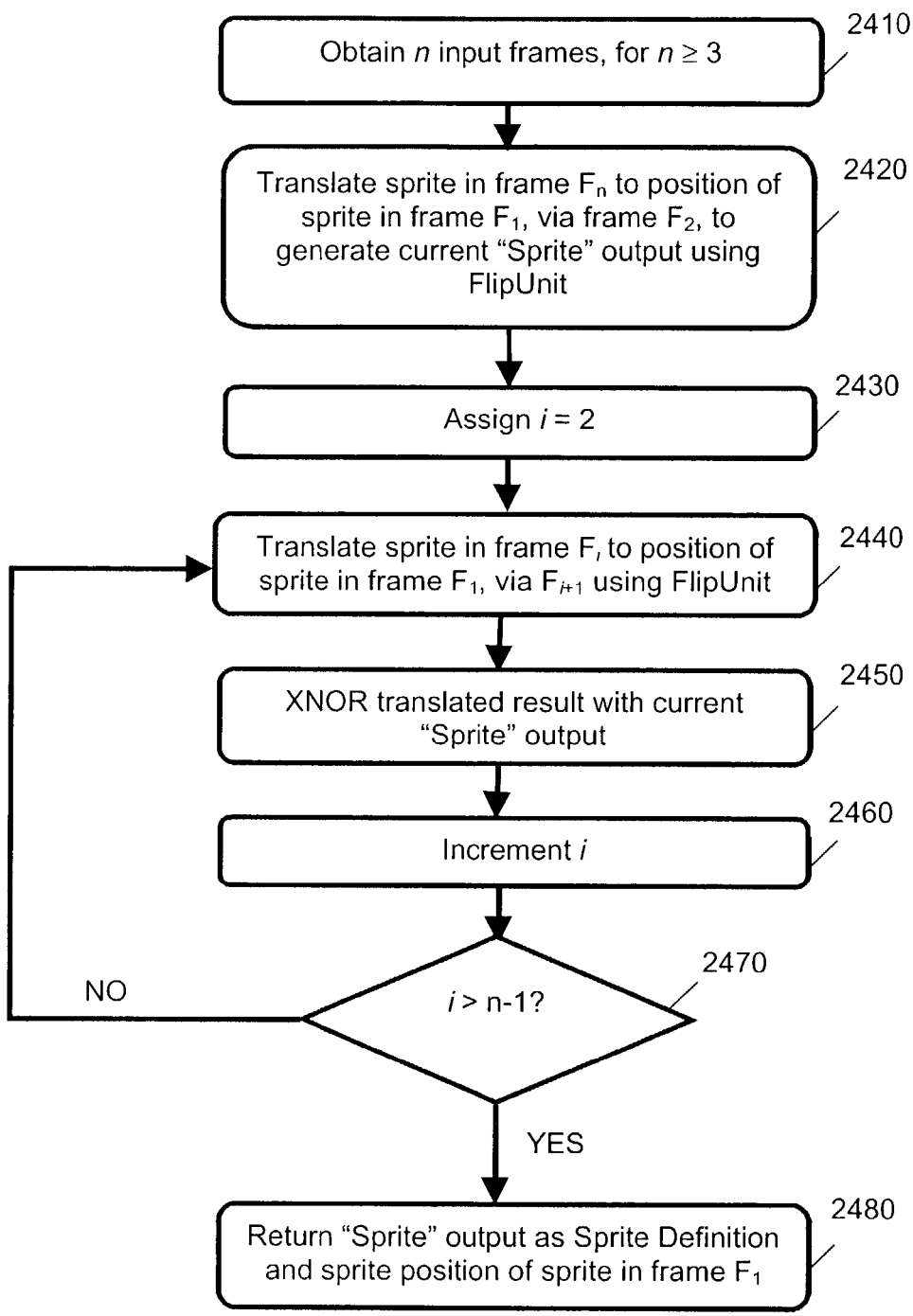
FIG. 24 is a flowchart of an algorithm for identifying a sprite in an animated sequence such as represented in FIG. 2, as per step 110 in FIG. 1.
Figure 25:
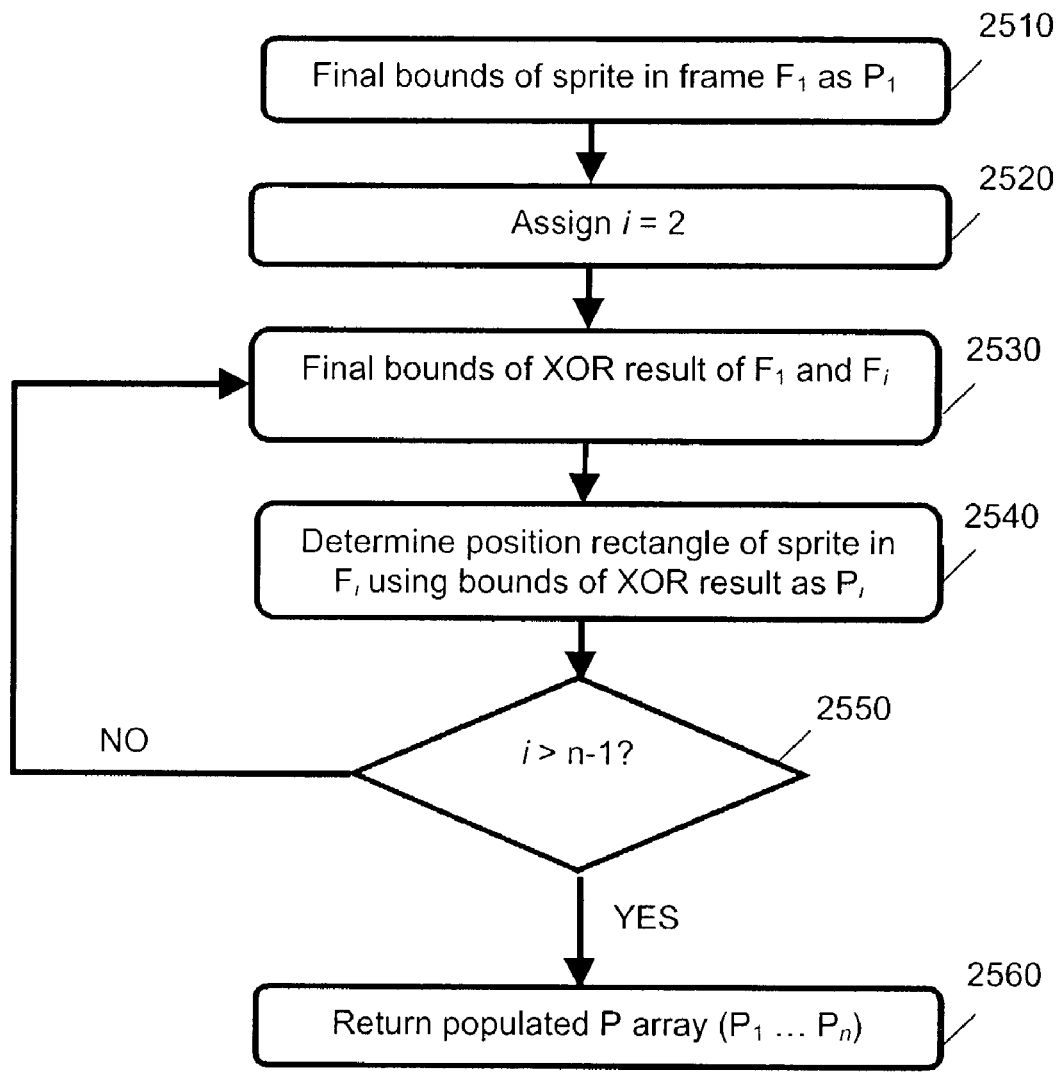
FIG. 25 is a flowchart of an algorithm for identifying a translation path in an animated sequence such as represented in FIG. 2, as per step 120 in FIG. 1.
Figure 26:
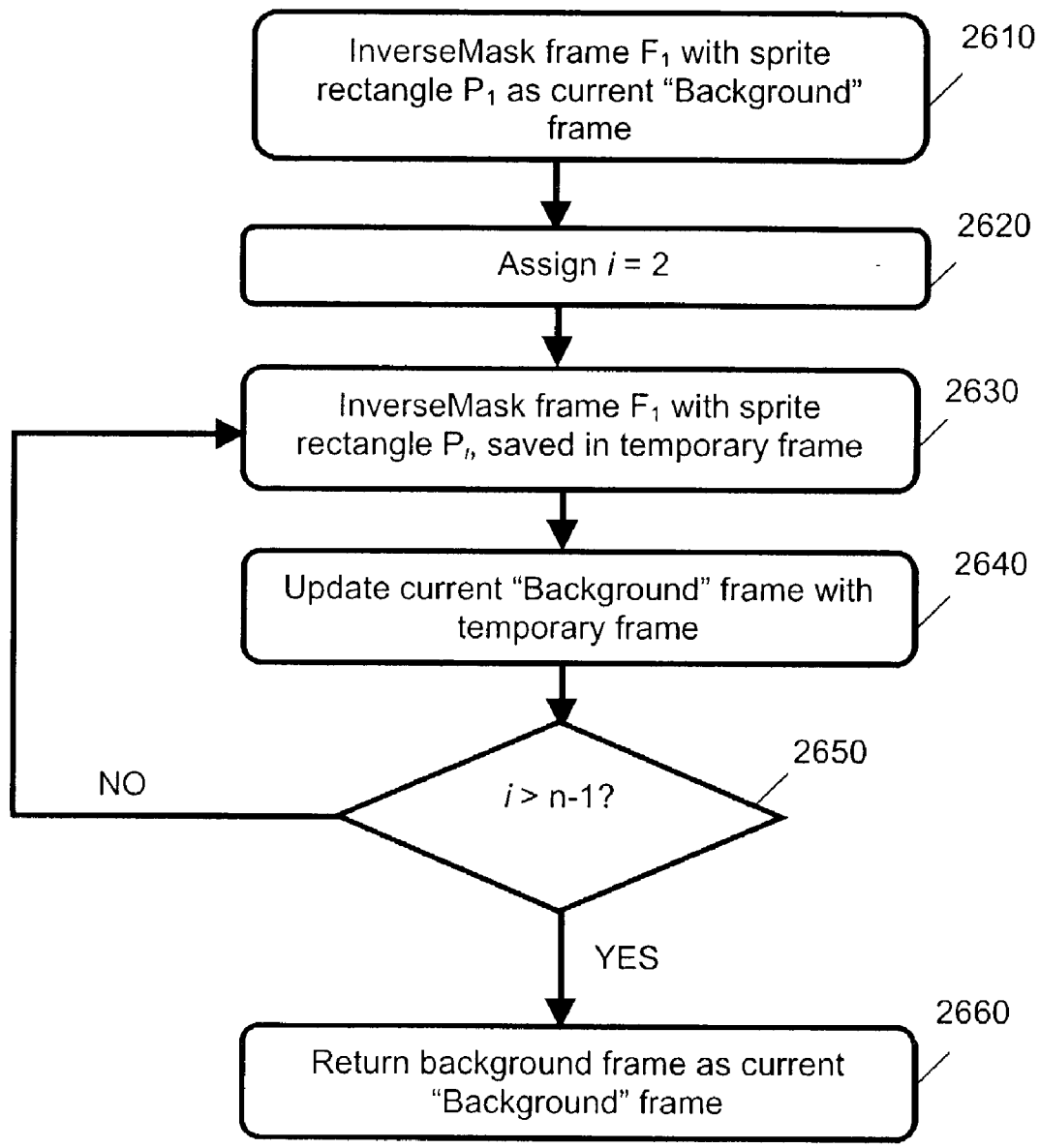
FIG. 26 is a flowchart of an algorithm for identifying a backgound in an animated sequence such as represented in FIG. 2, as per step 130 in FIG. 1.

FIG. 23. flowcharts steps performed for the FlipUnit operation, each of which is described below with reference to correspondingly numbered steps.

Figure 11:
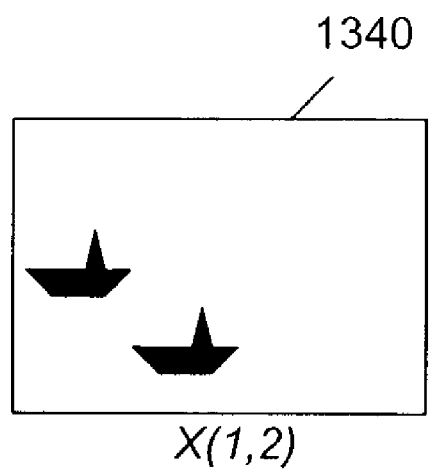
FIG. 11 is a frame that represents the result of an "XOR" operation on frames $F_1$ and $F_2$ of FIG. 10.
Figure 12:
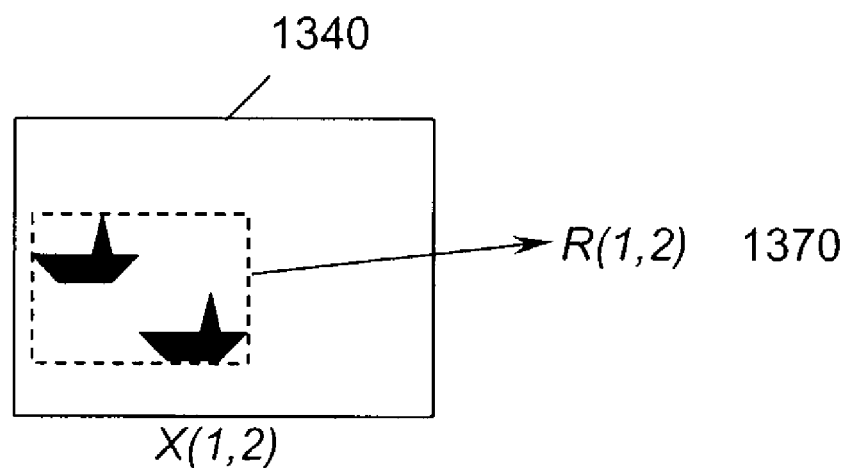
FIG. 12 is an image that represents the result of a "bounds" operation on the image of FIG. 11.

| | |
|---|---|
| Step 2305 | XOR the first two frames, $F_1$ 210 and $F_2$ 220, to obtain a third frame called X(1, 2) 1340. That is, perform the operation X(1, 2) = $F_1/F_2$. FIG. 11 schematically represents the result of this XOR operation, X(1, 2) 1340. |
| Step 2310 | Once X(1, 2) 1340 is obtained, get the bounding rectangle R(1, 2) 1370 for X(1, 2) 1340. That is, perform the operation R(1, 2) = Bounds(X(1, 2)). FIG. 12 schematically represents the bounding rectangle R(1, 2) 1370. |

-continued

Figure 13:
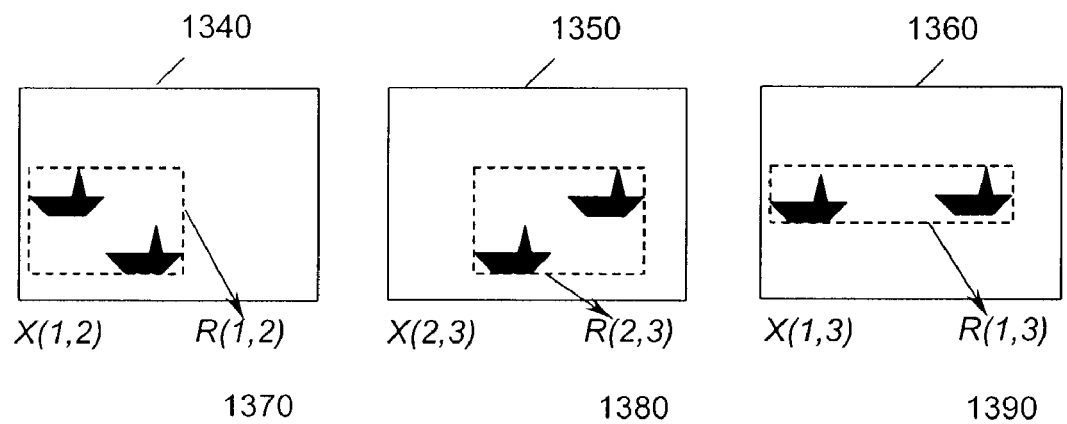
FIG. 13 comprises three images that each represent the respective results of "bounds" operations performed on combinations of "XOR" operations involving the three frames of FIG. 10.

Step 2305 & 2310  Similar to the way in which X(1, 2) 1340 and R(1, 2) 1370 is obtained as explained in the above steps 1 and 2, obtain the following operations indicated in Table 6 below. FIG. 13 schematically represents the results of these three different XOR and bounding operations.

TABLE 6

Figure 14:
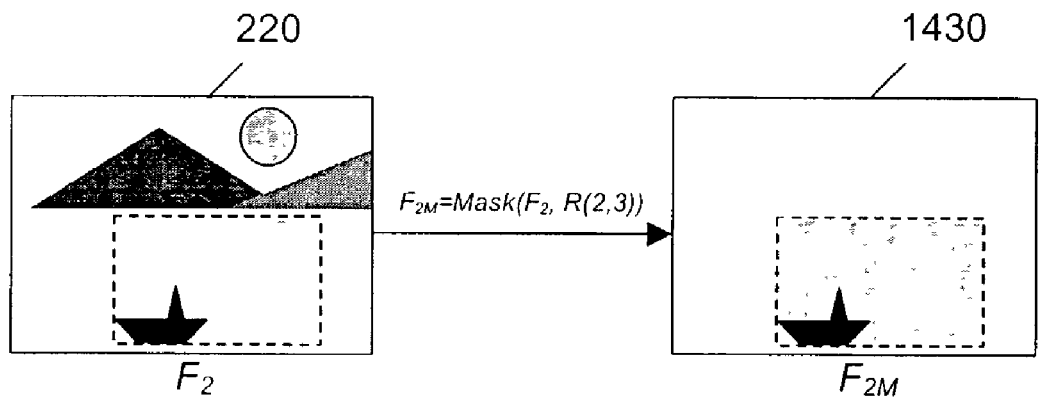
FIG. 14 comprises two images (labelled $F_2$ and $F_{2M}$) that represent the source ($F_2$) and result ($F_{2M}$) of a "mask" operation.
Figure 15:
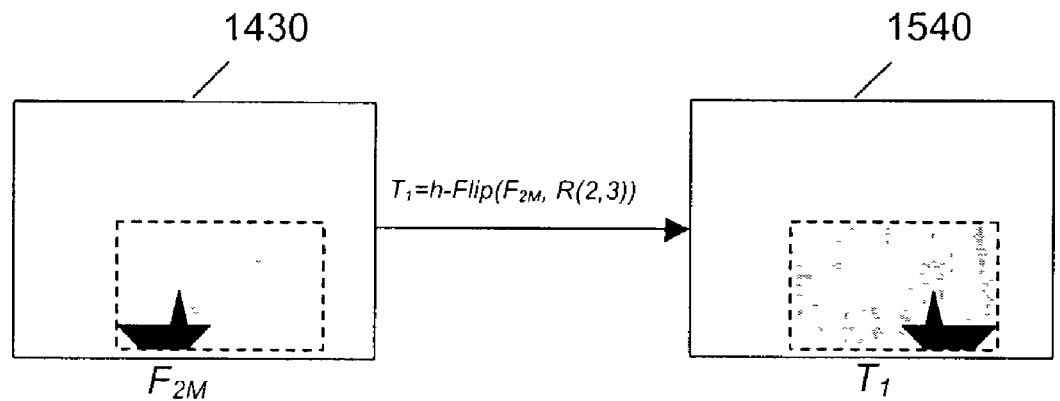
FIG. 15 comprises two images (labelled $F_{2M}$ and $T_1$) that represent the source ($F_{2M}$) and result ($T_1$) of a horizontal "flip" operation.
Figure 16:
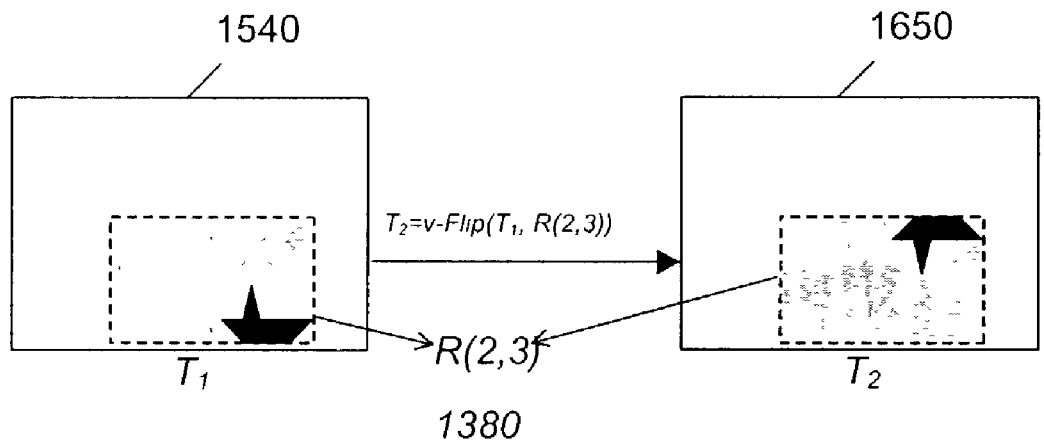
FIG. 16 comprises two images (labelled $T_1$ and $T_2$) that represent the source ($T_1$) and result ($T_2$) of a vertical "flip" operation.
Figure 17:
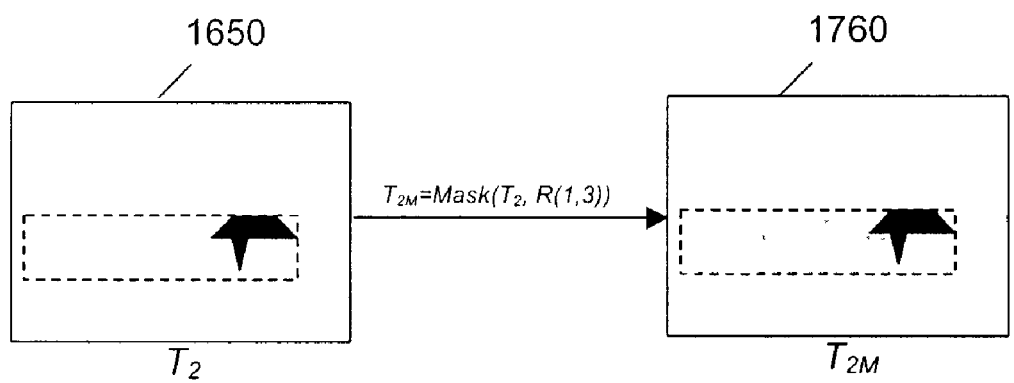
FIG. 17 comprises two images (labelled $T_2$ and $T_{2M}$) that represent the source ($T_2$) and result ($T_{2M}$) of a "mask" operation.
Figure 18:
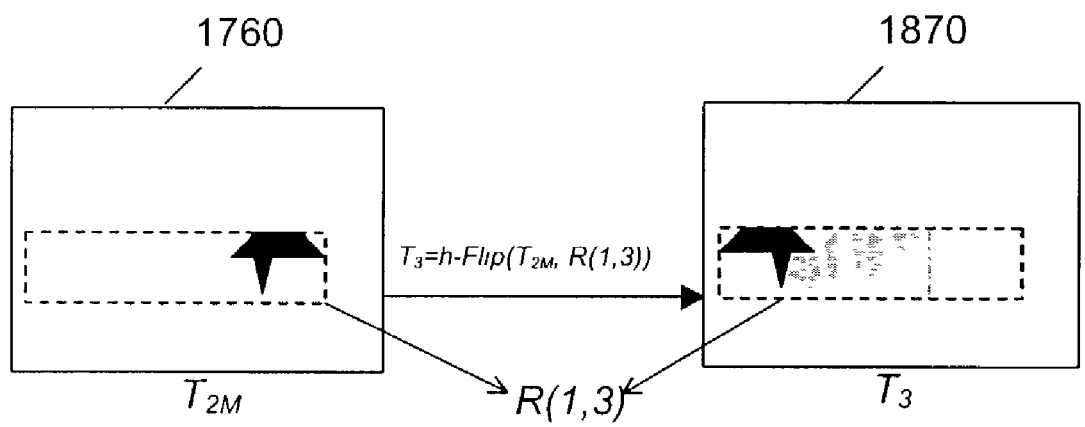
FIG. 18 comprises two images (labelled $T_{2M}$ and $T_3$) that represent the source ($T_{2M}$) and result ($T_3$) of a horizontal "flip" operation.
Figure 19:
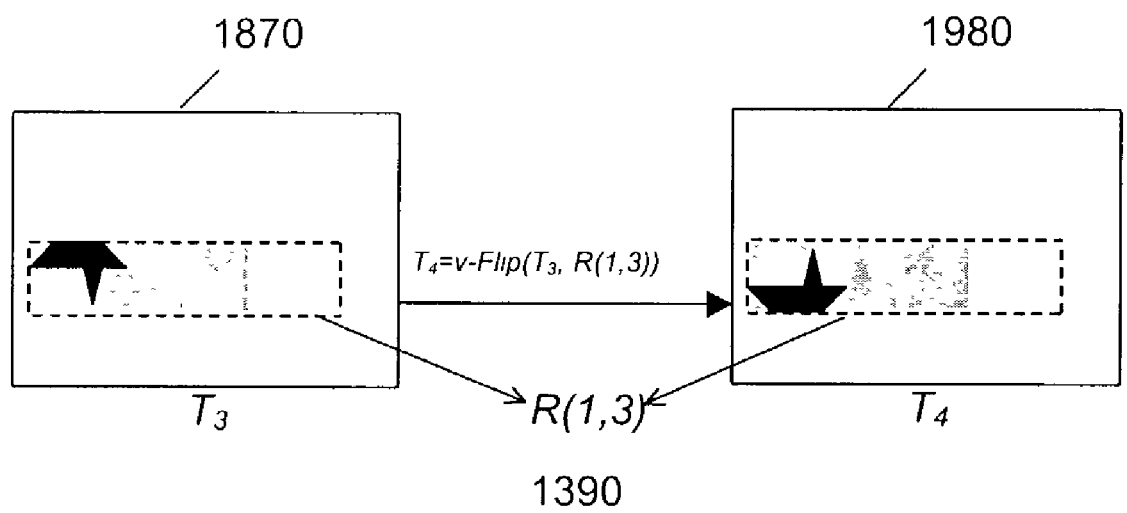
FIG. 19 comprises two images (labelled $T_3$ and $T_4$) that represent the source ($T_3$) and result ($T_4$) of a vertical "flip" operation.
Figure 20:
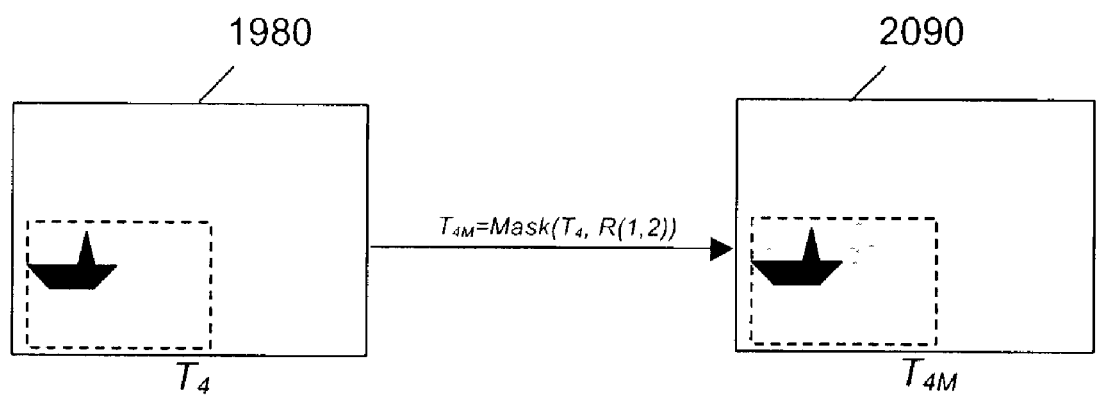
FIG. 20 comprises two images (labelled $T_4$ and $T_{4M}$) that represent the source ($T_4$) and result ($T_{4M}$) of a "mask" operation.
Figure 21:
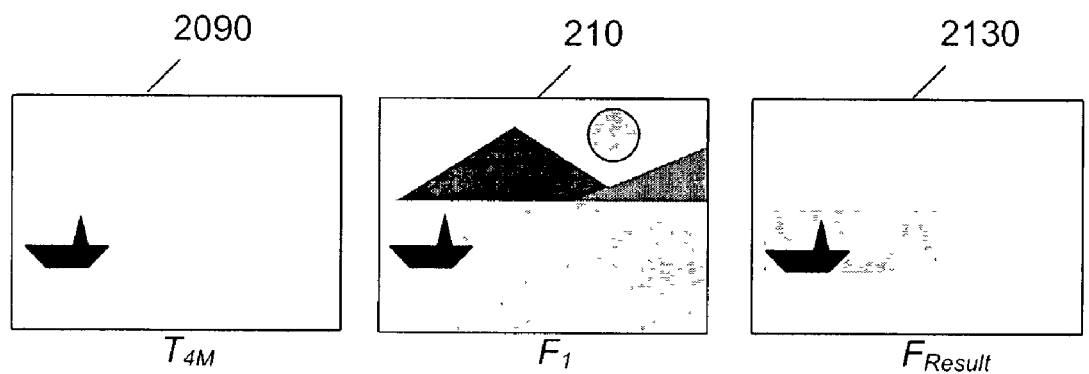
FIG. 21 comprises three images (labelled $T_{4M}$, $F_1$, $F_{Result}$) which illustrate the result of an "XNOR" operation involving two source images.

$X(2, 3) = F_2/F_3$
$X(1, 3) = F_1/F_3$
$R(2, 3) = \text{Bounds}(X(2, 3))$
$R(1, 3) = \text{Bounds}(X(1, 3))$ Step 2315  Mask frame $F_2$ 220 with respect to R(2, 3) 1380. That is, let $F_{2M} = \text{Mask}(F_2, R(2, 3))$. FIG. 14 schematically represents the source frame $F_2$ 220 and target frame $F_{2M}$ 1430.
Step 2320  Flip horizontally $F_{2M}$ 1430 with respect to the rectangle R(2, 3) 1380. The resulting frame is referred to as $T_1$ 1540. That is, perform the operation $T_1 = \text{h-Flip}(F_{2M}, R(2, 3))$. FIG. 15 schematically represents source frame $F_{2M}$ and target frame $T_1$ 1540.
Step 2325  Flip vertically $T_1$ 1540 with respect to the rectangle R(2, 3) 1380. The resulting frame is referred to as $T_2$ 1650. That is, perform the operation $T_2 = \text{v-Flip}(T_1, R(2, 3))$. FIG. 16 schematically represents source frame $T_1$ and target $T_2$ 1650.
Step 2330  Mask $T_2$ 1650 with respect to R(1, 3) 1390. That is, let $T_{2M} = \text{Mask}(T_2, R(1, 3))$. FIG. 17 schematically represents the source frame $T_2$ 1650 and target frame $T_{2M}$ 1760.
Step 2335  Flip horizontally $T_{2M}$ 1760 with respect to the rectangle R(1, 3) 1390. The resulting frame is referred to as $T_3$ 1870. That is, perform the operation $T_3 = \text{h-Flip}(T_{2M}, R(1, 3))$. FIG. 18 schematically represents source frame $T_{2M}$ 1760 and target frame $T_3$ 1870.
Step 2340  Flip vertically $T_3$ 1870 with respect to the rectangle R(1, 3) 1390. The resulting frame is referred to as $T_4$ 1980. That is, perform the operation $T_4 = \text{v-Flip}(T_3, R(1, 3))$. FIG. 19 schematically represents source frame $T_3$ 1870 and target frame $T_4$ 1980.
Step 2345  Mask frame $T_4$ 1980 with respect to rectangle R(1, 2) 1370. That is, $T_{4M} = \text{Mask}(T_4, R(1, 2))$. FIG. 20 schematically represents source frame $T_4$ 1980 and target frame $T_{4M}$ 2090.
Step 2310  XNOR frame $F_1$ 210 with $T_{4M}$ 2090. The output frame $F_{Result}$ 2130 is the result of the FlipUnit. That is, $F_{Result} = F_1 \Phi T_{4M}$. FIG. 21 schematically represents source frame $F_1$ 210 and $T_{4M}$ 2090, and target frame $F_{Result}$ 2130.

The above-described steps of the FlipUnit operation return $F_{Result}$ 2130 as the resulting frame of the operations performed. The FlipUnit operation takes any three frames (for example, $F_1$ 210, $F_2$ 220 and $F_3$ 230) as input and provides an output frame that translates the sprite in a second frame to the sprite position in a first frame using a third frame. The output frame has the sprite in the position of the sprite in the first frame. Pseudocode for FlipUnit using the operations described herein is presented in Table 7.

The FlipUnit operation is used to extract a maximum definition of the sprite using three operand frames from an animation sequence, as described directly below.

TABLE 7

/* FlipUnit procedure */
procedure FlipUnit($F_1$, $F_2$, $F_3$)
  $X(1,2) = F_1/F_2$;
  $X(1,3) = F_1/F_3$;
  $X(2,3) = F_2/F_3$;

TABLE 7-continued $R(1,2) = \text{Bounds}(X(1,2))$;
  $R(2,3) = \text{Bounds}(X(2,3))$;
  $R(1,3) = \text{Bounds}(X(1,3))$;
  $F_{2M} = \text{Mask}(F_2, R(2,3))$;
  $T_1 = \text{h-Flip}(F_{2M}, R(2,3))$;
  $T_2 = \text{v-Flip}(T_1, R(2,3))$;
  $T_{2M} = \text{Mask}(T_2, R(1,3))$;
  $T_3 = \text{h-Flip}(T_{2M}, R(1,3))$;
  $T_4 = \text{v-Flip}(T_3, R(1,3))$;
  $T_{4M} = \text{Mask}(T_4, R(1,2))$;
  $F_{Result} = F_1 \Phi T_{4M}$;
  Return $F_{Result}$
end procedure Algorithm for Sprite Identification A call to the FlipUnit operation is made in the following manner: $F_{Result}=\text{FlipUnit}(F_i, F_j, F_k)$. The FlipUnit operation translates the sprite in $F_j$ to the position of the sprite in $F_1$ using $F_k$. The $F_{Result}$ has the intermediary definition of the sprite in position of $F_1$.

Consider n frames in an animation sequence. A minimum of three frames are used that is $(n \geq 3)$ in this technique.

Consider the pseudocode presented in Table 8.

TABLE 8

```
Sprite=FlipUnit(F1, Fn, F2);
for i=2 to n−1 do
    Result=FlipUnit(F1, F1, Fi+1);
    Sprite=Sprite Φ Result;
end for
```

At the end of the execution of the for loop presented in Table 8, a definition of the sprite from the given n frames is available in the frame referred to as "Sprite". The described techniques attempt to determine algorithmically from the frames of the animation sequence, a sprite definition that essentially agrees with what is quite clearly perceived to be the sprite, when viewing the animation.

In the first instruction given above, the sprite in frame $F_n$ is translated to the position of sprite in frame $F_1$ using $F_2$ as the intermediary frame. The output serves as the starting point for the sprite definition.

In each iteration of the loop, the sprite in frame $F_i$ is translated to the sprite position in $F_1$ using $F_{i+1}$ as the intermediary frame. This procedure is for frames $F_2$ to $F_{n-1}$. In each iteration, the result from the FlipUnit operation is accumulated in the "Sprite" frame by XNOR-ing the output with the latest definition of the "Sprite" frame. That is, the FlipUnit operation updates the "Sprite" frame using the XNOR operation. This procedural loop completes the sprite identification process. By the end of this algorithm, one obtains a definition of the sprite and also the sprite's position in the frame $F_1$.

Translation Path Identification

Figure 22:
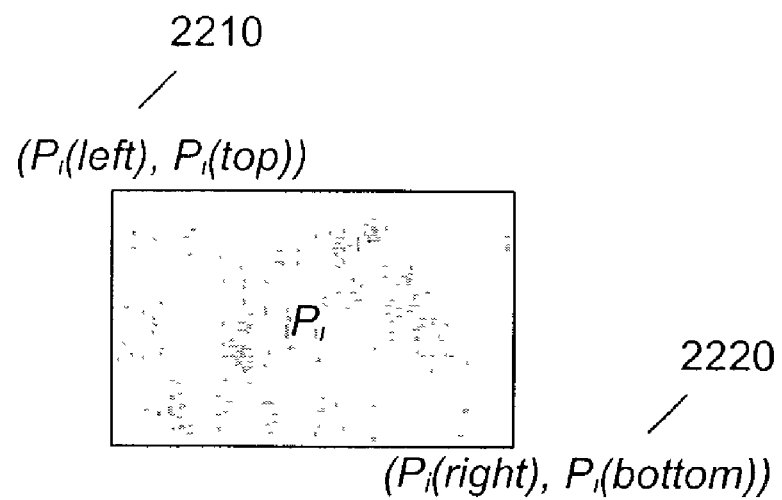
FIG. 22 is a representation of a co-ordinate system used to orient an identified sprite.

Assume that the translation path is to be stored in a path vector P, in which the positions of the sprite in frames $F_1$ to $F_n$ is stored in variables $P_1$ to $P_n$. Further, assume that each $P_i$ is a rectangle indicating the position of the sprite in the frame. From the above-described process of sprite identification, $P_1$ is known. A determination action can thus be made of the other values of P by using the following algorithm. FIG. 22 schematically represents this co-ordinate system. $P_1$(left) gives the x coordinate of the top left point 2210, and $P_i$ (bottom) gives the Y coordinate of the bottom right point.

In this coordinate system, the origin is the top left corner of the screen and the right direction is positive for x-axis, and the down direction is positive for y-axis.

Table 9 presents pseudocode for determining path vector P.

TABLE 9

```
P1=Bounds(Sprite);
for i=2 to n do
    pi=findNext(P1, F1, Fi);
end for
```

The findNext procedure used in the algorithm of Table 9 is defined in the psuedocode presented in Table 10.

TABLE 10

```
procedure findNext(P, A, B)
    T=A/B;
    Temp=Bounds(T);
    R(left) =P(left) + (Temp(left) −P(left));
    R(right) =P(right) + (Temp(right) −P(right));
    R(top) =P(top) + (Temp(top) −P(top));
    R(bottom) =P(bottom) + (Temp(bottom) −P(bottom));
    return R;
end procedure
```

The position of the sprite in $F_1$ is first determined. The bounding rectangle for the XOR-ed output of $F_1$ and the frame $F_i$ of the current iteration is then obtained. Then, using this bounding rectangle, and the position of sprite in $F_1$, a determination is made of the position rectangle for the sprite in $F_i$ using calculations presented in Table 10. After execution of this pseudocode, the translation path of the sprite is established. The last item to be established is the definition of the background, which is described directly below.

Background Identification

With the definition of the sprite and the positions of the sprite in the different frames already established, the background is determined using pseudocode presented in Table 11.

TABLE 11

```
Background=InverseMask(F1, P1);
for i=2 to n do
    temp=InverseMask(Fi, Pi);
    Background=Background+temp;
end for
```

After the execution of the loop, the "Background" frame contains the maximum background information that is necessary to correctly reproduce the animation.

After these above-described three steps of (i) sprite identification, (ii) translation path identification and (iii) background identification, the described procedure is completed. The entire animation is represented by a single background image, a single sprite image and a path vector.

This canonical representation can be used to suitably compress the animation sequence. The identified sprite can be searched in a database of images and matched with appropriate entries.

Computer Hardware and Software

Figure 27:
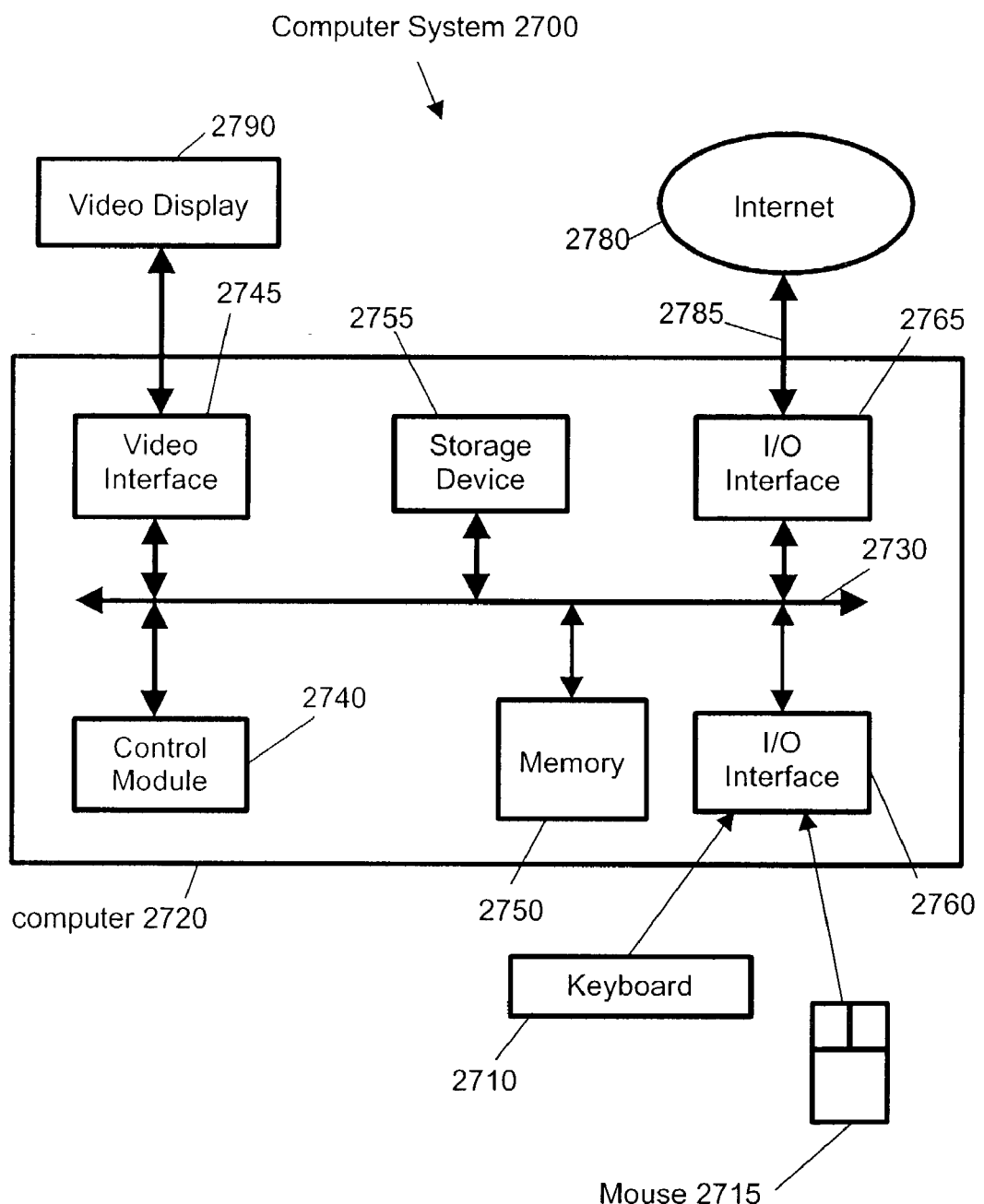
FIG. 27 is a schematic representation of a computer system suitable for performing the techniques described with reference to FIGS. 1 to 26.

FIG. 27 is a schematic representation of a computer system 2700 that can be used to perform steps in a process that implement the techniques described herein. The computer system 2700 is provided for executing computer software that is programmed to assist in performing the described techniques. This computer software executes under a suitable operating system installed on the computer system 2700.

The computer software involves a set of programmed logic instructions that are able to be interpreted by the computer system 2700 for instructing the computer system 2700 to perform predetermined functions specified by those instructions. The computer software can be an expression recorded in any language, code or notation, comprising a set of instructions intended to cause a compatible information processing system to perform particular functions, either directly or after conversion to another language, code or notation.

The computer software is programmed by a computer program comprising statements in an appropriate computer language. The computer program is processed using a compiler into computer software that has a binary format suitable for execution by the operating system. The computer software is programmed in a manner that involves various software components, or code means, that perform particular steps in the process of the described techniques.

The components of the computer system 2700 include: a computer 2720, input devices 2710, 2715 and video display 2790. The computer 2720 includes: processor 2740, memory module 2750, input/output (I/O) interfaces 2760, 2765, video interface 2745, and storage device 2755.

The processor 2740 is a central processing unit (CPU) that executes the operating system and the computer software executing under the operating system. The memory module 2750 includes random access memory (RAM) and read-only memory (ROM), and is used under direction of the processor 2740.

The video interface 2745 is connected to video display 2790 and provides video signals for display on the video display 2790. User input to operate the computer 2720 is provided from input devices 2710, 2715 consisting of keyboard 2710 and mouse 2715. The storage device 2755 can include a disk drive or any other suitable non-volatile storage medium.

Each of the components of the computer 2720 is connected to a bus 2730 that includes data, address, and control buses, to allow these components to communicate with each other via the bus 2730.

The computer system 2700 can be connected to one or more other similar computers via a input/output (I/O) interface 2765 using a communication channel 2785 to a network 2780, represented as the Internet.

The computer software program may be provided as a computer program product, and recorded on a portable storage medium. In this case, the computer software program is accessed by the computer system 2700 from the storage device 2755. Alternatively, the computer software can be accessed directly from the network 2780 by the computer 2720. In either case, a user can interact with the computer system 2700 using the keyboard 2710 and mouse 2715 to operate the programmed computer software executing on the computer 2720.

The computer system 2700 is described for illustrative purposes: other configurations or types of computer systems can be equally well used to implement the described techniques. The foregoing is only an example of a particular type of computer system Suitable for implementing the described techniques.

Conclusion

A method, a computer system and computer software are described herein in the context of sprite recognition for translating sprites that do not scale or shear etc.

Techniques are described herein only with reference to the above-described constraints that the boundary pixels of the sprite are of a different colour from the background pixel at that location. The described techniques can, for example, be appropriately modified to handle relatively minor changes in the colours of the sprite and the background.

Various alterations and modifications can be made to the techniques and arrangements described herein, as would be apparent to one skilled in the relevant art.

I claim:

1. A method of identifying a translating sprite in a selection of image frames in an animated sequence, the method comprising the steps of:
    (i) determining differences in each of three pairs of first, second and third frames, to identify respective representations of the sprites in each pair of two frames;
    (ii) determining a rectangle bounding the two respective sprite representations in each of the three pairs of frames;
    (iii) selecting only a portion of the second frame within a bounded rectangle of the second frame and the third frame to produce a first masked frame;
    (iv) horizontally and vertically inverting the selected portion of the second frame within the first masked frame to produce a first inverted frame;
    (v) selecting only a portion of the first inverted frame within a bounded rectangle of the first frame and third frame to produce a second masked frame;
    (vi) horizontally and vertically inverting the selected portion of the second masked frame within the second masked frame to produce a second inverted frame;
    (vii) selecting only a portion of the second inverted frame within a bounded rectangle of the first frame and second frame to produce a third masked frame; and
    (viii) comparing the third masked frame and the first frame to identify the sprite within the first frame.

2. The method as claimed in claim 1, wherein said step (i) of determining differences in pairs of frames involves a XOR operation on two operand frames.

3. The method as claimed in claim 2, wherein the XOR operation produces (a) white pixels where the corresponding pixels of the two operand frames match, and (b) black pixels where the corresponding pixels of the two operand frames do not match.

4. The method as claimed in claim 1, wherein said steps (iii), (v) and (vii) of selecting only a portion of a frame involves a masking operation.

5. The method as claimed in claim 4, wherein the masking operation produces white pixels outside of the bounded rectangle, and retains original pixels within the bounded pixels.

6. The method as claimed in claim 1, further comprising the step of: performing steps (i) to (viii) as many times as there are frames in an animation sequence.

7. The method as claimed in claim 1, wherein the first, second and third frames are respectively frames $F_1$, $F_n$, and $F_2$ of an animation sequence comprising frames $F_1$ to $F_n$.

8. The method as claimed in claim 7, further comprising the steps of:
    repeating steps (i) to (viii) for first, second and third frames $F_1$, $F_i$ and $F_{i+1}$, for i having successive values from 2 to n−1; and
    updating a result frame produced by each series of steps (i) to (viii) by comparing the result with a result from the next iteration of steps (i) to (viii).

9. Computer software, recorded on a medium, for identifying translating sprites in animated sequences, the computer software comprising:
    (i) software code means for determining differences in each of three pairs of first, second and third frames, to identify respective representations of the sprites in each pair of two frames;
    (ii) software code means for determining a rectangle bounding the two respective sprite representations in each of the three pairs of frames;

(iii) software code means for selecting only a portion of the second frame within a bounded rectangle of the second frame and the third frame to produce a first masked frame;

(iv) software code means for horizontally and vertically inverting the selected portion of the second frame within the first masked frame to produce a first inverted frame;

(v) software code means for selecting only a portion of the first inverted frame within a bounded rectangle of the first frame and third frame to produce a second masked frame;

(vi) software code means for horizontally and vertically inverting the selected portion of the second masked frame within the second masked frame to produce a second inverted frame;

(vii) software code means for selecting only a portion of the second inverted frame within a bounded rectangle of the first frame and second frame to produce a third masked frame; and (viii) software code means for comparing the third masked frame and the first frame to identify the sprite within the first frame.

10. Computer software as claimed in claim 9, wherein said software code means for determining differences in pairs of frames involves a XOR operation on two operand frames.

11. Computer software as claimed in claim 10, wherein the XOR operation produces (a) white pixels where the corresponding pixels of the two operand frames match, and (b) black pixels where the corresponding pixels of the two operand frames do not match.

12. Computer software as claimed in claim 9, wherein said software code means (iii), (v) and (vii) for selecting only a portion of a frame involves a masking operation.

13. Computer software as claimed in claim 12, wherein the masking operation produces white pixels outside of the bounded rectangle, and retains original pixels within the bounded pixels.

14. Computer software as claimed in claim 9, further comprising software code means for executing software code means (i) to (viii) as many times as there are frames in an animation sequence.

15. Computer software as claimed in claim 9, wherein the first, second and third frames are respectively frames $F_1$, $F_n$, and $F_2$ of an animation sequence comprising frames $F_1$ to $F_n$.

16. Computer software as claimed in claim 15, further comprising:
software code means for executing software code means (i) to (viii) for first, second and third frames $F_1$, $F_i$ and $F_{i+}$, for i having successive values from 2 to n−1; and
software code means for updating a result frame produced by produced by software code means (i) to (viii) by comparing the result with a result from a next iteration produced by software code means (i) to (viii).

17. A computer system for identifying translating sprites in animated sequences, the computer system comprising:
(i) means for determining differences in each of three pairs of first, second and third frames, to identify respective representations of the sprites in each pair of two frames;

(ii) means for determining a rectangle bounding the two respective sprite representations in each of the three pairs of frames;

(iii) means for selecting only a portion of the second frame within a bounded rectangle of the second frame and the third frame to produce a first masked frame;

(iv) means for horizontally and vertically inverting the selected portion of the second frame within the first masked frame to produce a first inverted frame;

(v) means for selecting only a portion of the first inverted frame within a bounded rectangle of the first frame and third frame to produce a second masked frame;

(vi) means for horizontally and vertically inverting the selected portion of the second masked frame within the second masked frame to produce a second inverted frame;

(vii) means for selecting oniy a portion of the second inverted frame within a bounded rectangle of the first frame and second frame to produce a third masked frame; and (viii) means for comparing the third masked frame and the first frame to identify the sprite within the first frame.

18. The computer system as claimed in claim 17, wherein said means determining differences in pairs of frames involves a XOR operation on two operand frames.

19. The computer system as claimed in claim 18, wherein the XOR operation produces (a) white pixels where the corresponding pixels of the two operand frames match, and (b) black pixels where the corresponding pixels of the two operand frames do not match.

20. The computer system as claimed in claim 17, wherein said means (iii), (v) and (vii) for selecting only a portion of a frame use a masking operation.

21. The computer system as claimed in claim 20, wherein the masking operation produces white pixels outside of the bounded rectangle, and retains original pixels within the bounded pixels.

22. The computer system as claimed in claim 17, further comprising means for executing software code means (i) to (viii) as many times as there are frames in an animation sequence.

23. The computer system as claimed in claim 17, wherein the first, second and third frames are respectively frames $F_1$, $F_n$, and $F_2$ of an animation sequence comprising frames $F_1$ to $F_n$.

24. The computer system as claimed in claim 23, further comprising:
means for executing software code means (i) to (viii) for first, second and third frames $F_1$, $F_i$ and $F_{i+1}$, for i having successive values from 2 to n−1; and
means for updating a result frame produced by produced by software code means (i) to (viii) by comparing the result with a result from a next iteration produced by software code means (i) to (viii).

* * * * *